United States Patent [19]
Jaski

[11] 3,850,112
[45] Nov. 26, 1974

[54] FILLER DEVICE

[76] Inventor: Ray Jaski, 26 Sheffield Ln., Oakbrook, Ill. 60521

[22] Filed: May 13, 1971

[21] Appl. No.: 143,068

[52] U.S. Cl. ............................................. 105/489
[51] Int. Cl. ...................... B61d 45/00, B60p 7/16
[58] Field of Search ............. 105/367, 369 B, 369 S; 214/10.5, 16.1; 248/119; 229/14; 206/62

[56] References Cited
UNITED STATES PATENTS

| | | | |
|---|---|---|---|
| 2,474,949 | 7/1949 | Lewis et al. ..................... | 105/369 S |
| 3,146,729 | 9/1964 | Langston ........................... | 105/367 |
| 3,421,451 | 1/1969 | Brucks ............................. | 105/369 B |
| 3,424,108 | 1/1969 | Vargen ............................ | 105/369 B |

*Primary Examiner*—Drayton E. Hoffman
*Attorney, Agent, or Firm*—Roy E. Petherbridge; Robert L. Lindgren; Edward D. Gilhooly

[57] ABSTRACT

A reusable filler device for preventing shifting or other movement of cargo within a railroad car, a truck and the like during transit or storage. The filler device includes at least one slotted and horizontally disposed support member which includes a surface adapted to abut the sides of the cargo adjacent the interface of two stacked items thereof. The horizontal filler member is supported by interconnecting vertical support members which are adapted to contact the floor of the car to maintain the horizontal member in proper position. A plurality of intermediate elements are disposed in interconnection with the horizontal member wherein both the intermediate elements and the vertical support elements include vertical disposed surfaces adapted to abut the sidewall of the car for stabilization of the load.

8 Claims, 9 Drawing Figures

FILLER DEVICE

BACKGROUND OF THE INVENTION

This invention relates in general to stabilizing means and in particular to a novel filler or dunnage device for preventing shifting and other movement of cargo within a cargo area.

More specifically, the invention relates to a filler or dunnage device which immobilizes cargo within a railroad car, a truck and the like in such a manner that the cargo is prevented from shifting or producing other damaging movement during transit or storage. The filler device includes slotted vertical and horizontal elements which are arranged so that the horizontal filler element includes a vertical surface which abuts the inner face between two layers of stacked boxes and the like being supported. Two vertical support members interconnect with the horizontal member to establish the height of the horizontal for positioning of the filler. To aid in the support of the cargo within the car or truck, a plurality of smaller intermediate vertical dunnage members are utilized to bear against the sidewall of the storage area and interconnect with the horizontal disposed member.

In transportation of cargo such as boxes in freight cars and long haul trucks, the horizontal dimension of the stack of boxes often does not equal the dimension of the particular car carrying the cargo. Thus, a void or space between or space between the sidewall and the cargo results which permits shifting or other movement of the boxes within the car during transit. Such shifting can severely damage or destroy the particular goods being shipped. In the prior art, several filler type or dunnage devices have been utilized in an attempt to minimize and alleviate the problems created by the undesirable shifting of boxes within a freight car. Some prior art techniques have utilized bulky wood or metal type filler devices which have proved to be relatively ineffective in achieving selected adjustability of the dunnage members without considerable installation labor being required. Moreover, wood filler members are also relatively costly in expense and often are not reusable.

In an attempt to overcome the expense problems and installation disadvantages created by the use of wooden or other similar fillers, some previous dunnage techniques of stabilizing the cargo within railroad cars have employed cardboard or plastic elements to achieve the desired load stabilization. Many of these systems utilized interconnecting members which are secured to the wall of the car at a point adjacent the top of the cargo. Because the filler device is located in the upper part of the car, it was necessary to physically attach the filler to the car. The requirement that the member be attached to the car was undesirable since the filler and attachment means had to be removed from the car after use. It has been found that damage or destruction of the filler element often resulted when removed from the wall to reduce the useful life of the filler.

Further, the particular design of the previous cardboard or fiber fillers required a relatively great amount of material and number of elements to accomplish suitable retention of the cargo. Therefore, it is desirable to provide a reusable and inexpensive filler or dunnage device which is readily positioned between the cargo and the wall of the railroad car or truck and which only requires a minimum of material to achieve satisfactory immobilization of the contents within the storage area.

SUMMARY OF THE INVENTION

It is, therefore, an object of this invention to improve the stabilization of cargo within a transporting vehicle.

Another object of this invention is to immobilize the movement of cargo within a railroad car or truck with an inexpensive and effective filler device.

A further object of this invention is to effectively prevent movement of cargo created by a void or space existing between the wall of the transporting vehicle and the stack of elements of the cargo.

Still another object of this invention is to reduce the number of elements necessary to support the lateral sides of a cargo.

A still further object of this invention is to operatively position a filler device without physical attachment to the walls of the transporting vehicle.

These and other objects are attained in accordance with the present invention wherein there is provided a novel filler or dunnage device which prevents undesired shifting or movement of cargo within a transporting vehicle. The filler device of the invention includes a plurality of interconnecting slotted elements which have vertically disposed bearing surfaces adapted to confront the side surfaces of the cargo being transported and the sidewall of the transporting vehicle. One of the elements of the filler device comprises a horizontally disposed member having a surface aligned in a vertical plane to abut the interface between adjacent stacked boxes of the cargo. Thus, the filler device of the invention requires only a single horizontal member for each two rolls of stacked boxes. Vertical support members establish the height of the horizontal member in relation to the cargo and also provides a vertical disposed surface for bearing against the side wall of the car.

Intermediate the horizontal members are a plurality of vertically oriented elements which interconnect with the horizontal member and also provide a bearing surface for abutment against the sidewall of the car. Thus, the filler device of the invention achieves desired stabilization of the load within a freight car with a minimum of elements whereby the vertical oriented surfaces of the device respectively confront the load and the sidewall to provide a suitably strong and inexpensive filler plug in the void between the cargo and the wall of the freight car. Since the novel filler device disclosed herein is supported from the floor of the car, the necessity of physically attaching the elements thereof to the cargo or to the walls of the vehicle is completely alleviated thereby allowing the filler device to be utilized for extended period of time in conjunction with numerous different loads.

DESCRIPTION OF THE DRAWINGS

Further objects of the invention together with additional features contributing thereto and advantages accruing therefrom will be apparent from the following description of an embodiment of the invention when read in conjunction with the accompanying drawings wherein.

DESCRIPTION OF THE PREFERRED EMBODIMENT

Figure 1:
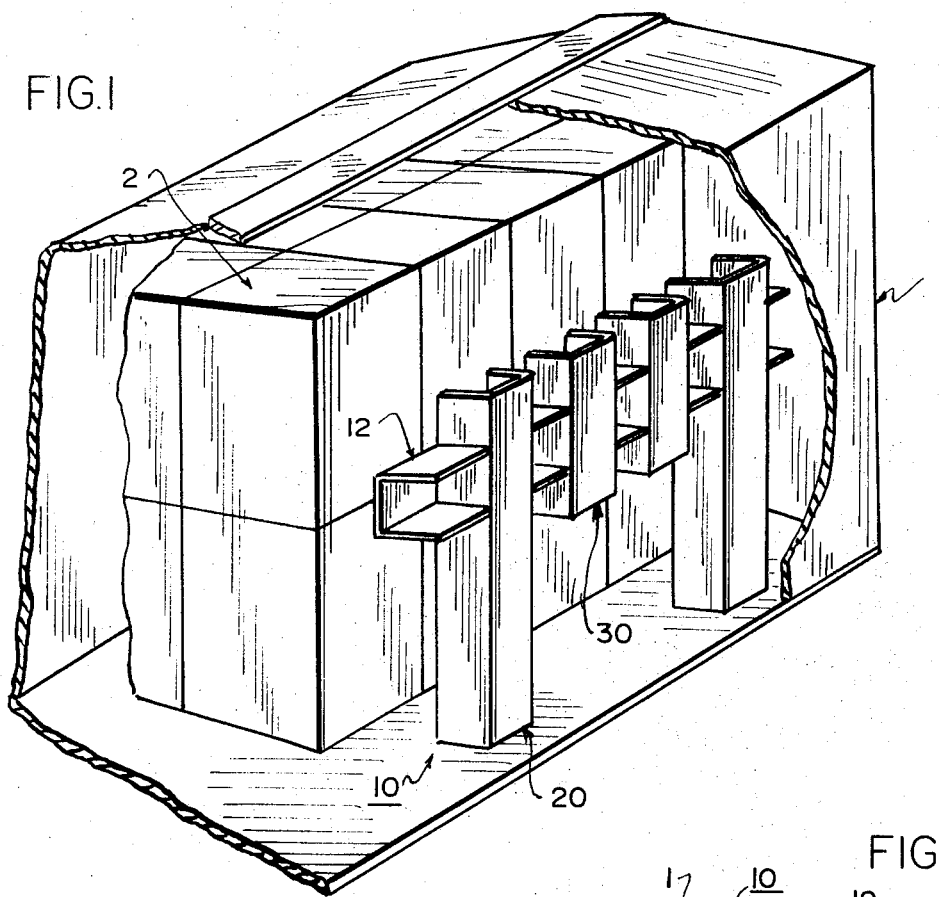
FIG. 1 is a perspective side illustration of an embodiment of the filler device in use stabilizing a load in a railroad car.
Figure 2:
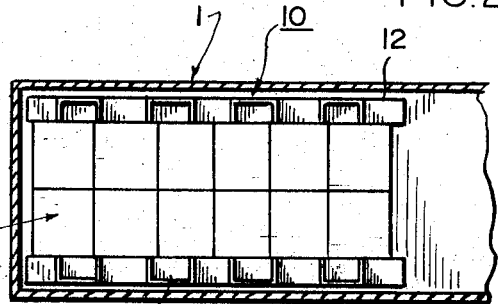
FIG. 2 is a top sectional schematic illustration of the filler device of FIG. 1.

Referring now to FIGS. 1 and 2, there is illustrated an embodiment of the filler device or dunnage plug 10 of the invention in typical use as the stabilizing means for preventing lateral or shifting movement of cargo such as boxes within a truck or railroad car 1. As shown in FIG. 1, the filler device 10 confronts the sidewall of cargo 2 within a railroad car 1 in a manner to prevent movement of the load from shifting due to the existence of a void or space between the sidewall of railroad car 1 and cargo 2. Viewing FIG. 2, it can be seen that the filler device 10 can be utilized to plug a void created between the cargo 2 and a plurality of the sidewalls of the railroad car if desired. It should be apparent that if the filler device 10 of the invention is not present in the space adjacent the load that normal movement of the vehicle in transit would cause shifting and considerable damage to the cargo within the car.

Figure 4:
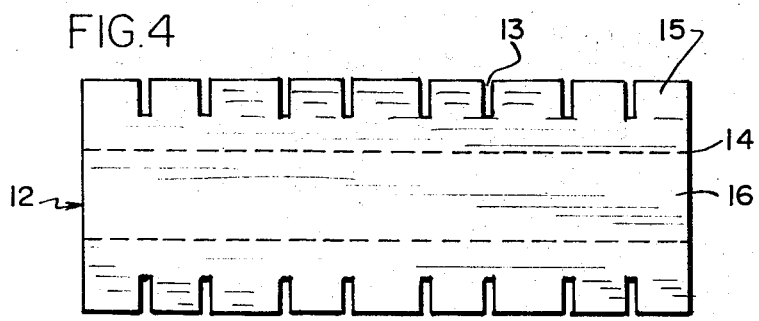
FIG. 4 is a side schematic illustration of the horizontal element of the filler device of FIG. 1 in unassembled form.

Filler device 10 includes a plurality of interconnecting elements which are adapted to abut or be in near contact within the box car and the sidewall of the car 1 to substantially plug the void therebetween. Although not intended to be limited, for convenience of illustration, cargo 2 is shown to be a plurality of large carton boxes which includes a vertical stack of at least two or more boxes. Filler device 10 possesses a horizontally directed member 12 which is adapted to be in contact or near contact with the cargo within the car. As best shown in FIG. 4, the horizontally disposed member 12 is formed prior to being assembled in the filler device as a rectangular, flat element which may be constructed of any suitable material such as cardboard, plastic and the like. The longitudinal edges of horizontal member 12 includes a plurality of elongated laterally oriented open-ended slots 13 which are positioned along the length of the member. The body of the member 12 further includes a pair of parallel scored lines 14 which extend longitudinally of the member 12 in a manner to allow folding of portions 15 of member 12 relative to a center surface 16 to assume an operative U-shaped configuration.

Figure 5:
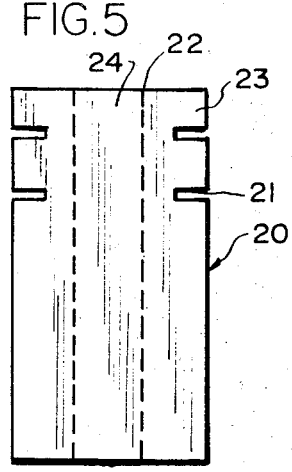
FIG. 5 is a side schematic illustration of the vertical end members of the filler device of FIG. 1 1 in unassembled form.

Filler device further includes vertical support members 20 as best shown in FIG. 5 in unassembled form. Prior to assembly in the filler device, member 20 is a rectangular, flat piece of material such as cardboard and the like which possess a pair of open-ended, laterally oriented slots 2 respectively on each of the longitudinal edges near one end thereof. Similar as illustrated with reference to the horizontal member of FIG. 4, the vertical support member includes a pair of longitudinally extending score lines 22 which permit the end portions 23 to be folded in the same direction along the longitudinal axis with respect to a center surface 24 to form a U-shape configuration.

Figure 6:
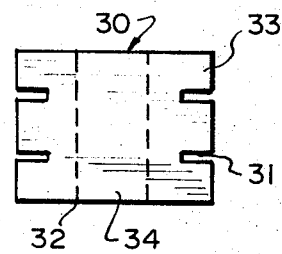
FIG. 6 is a side schematic illustration of the intermediate filler elements of the filler device of FIG. 1 in unassembled form.

Also adapted to be interconnected in the filler device 10 are a plurality of intermediate filler elements which are constructed with a similar material, but generally with a length less than support member 30. Referring to FIG. 6, the unassembled form of intermediate elements 30 is most clearly illustrated. Element 30 includes a pair of slots 31 mounted respectively on each of the longitudinal edges thereof and a pair of longitudinally extending score lines 32 to permit edge portions 33 of the member may be bent relative to mid-surface 34 to form a U-shape configuration. Slots 13, 21, and 31 in filler device 10 are preferably of an equal length, width, and distance apart for reasons to be described later.

Figure 3:
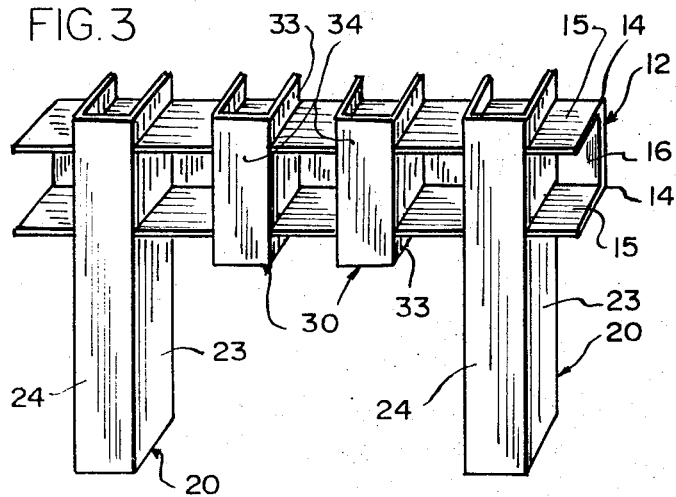
FIG. 3 is a perspective side illustration of the filler device shown in FIG. 1.
Figure 7:
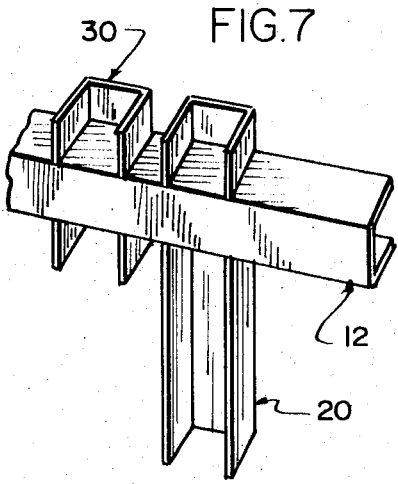
FIG. 7 is a partial perspective illustration of the filler device of FIG. 3 taken from the opposite side thereof.

In assembling the filler device for use, reference is made in particular to FIGS. 3 and 7 to 9 which shows the interconnection of the elements. Referring to FIGS. 3 and 7, a pair of support members 20 interconnect with horizontally disposed member 12 at each end thereof and an intermediate element 30 intercouples with horizontal member 12 intermediate the pair of support members 20. It should be apparent that the intermediate or base surface 16 of horizontal member 12 is disposed on the opposite side of the filler device than intermediate or base surfaces 24 and 34 of support member 20 and intermediate element 30.

Figure 9:
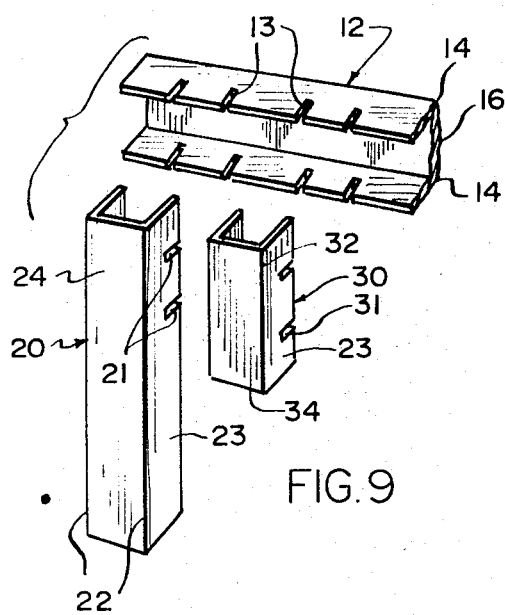
FIG. 9 is a perspective side illustration taken from the opposite side of FIG. 8.
Figure 8:
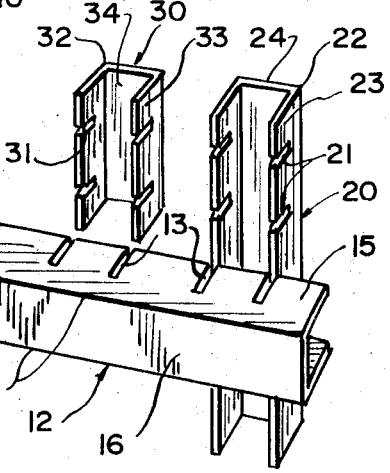
FIG. 8 is a partial schematic view of the elements of FIG. 7 in an unassembled form.

As best shown in FIGS. 8 and 9, the elements of the filler device prior to assembly is shown whereby a pair of the elongated slots 21 and 31 on the vertical support member and the intermediate element are interconnected with corresponding pairs of slots 16 provided on the edges of horizontally disposed member 12. Since vertical support element 20 possesses slots at one end, it should be apparent that the other end thereof is adapted to bear against the floor of the car for support of the horizontal member whereby the length of the vertical members is dependent on the positioning of member 12.

Referring again to FIGS. 1, 2, and 3, there is illustrated the assembled form of the filler device of the invention. Since the bearing surface 16 of the horizontally disposed member 12 is positioned on the opposite side of the assembled filler than are bearings surfaces 24 and 34, the bearing surface 16 is positionable in confrontation with the sidewall cargo 2 within the transporting vehicle and surfaces 24 and 34 are adapted to abut the sidewall car. In operation, the length of the vertical support members 20 are selected to be of a magnitude to allow the bearing surface 16 of horizontal member 12 to abut the stacked cargo at a point to contact the upper and lower box immediately at the interface therebetween. Thus the invention maintains securement of the load with only a single member substantially contacting two boxes of stacked cargo for any selected length.

Vertical support member 20 supports the horizontal member in its correct position by bearing on the floor of the car at the bottom end and in connection with the horizontal member adjacent the opposite end. The bearing surface 24 of support member 20 at the same time performs the function of substantially contacting the sidewall of the car whereby the combined effect of the surface 16 of member 12 contacting the cargo and surface 24 contacting the sidewall nullifies any movement of the cargo within the train to effectively plug the void. To aid in the prevention of movement and to provide stability to the filler unit, the intermediate elements 30 are utilized. Since they are shorter than support members 20, it is not necessary that they bear against the floor of the car and the bearing surface 34 thereof is in contact with the sidewall of car to immobilize the cargo. Any number of intermediate elements may be utilized in conjunction with the invention depending on the length of the cargo being supported and the longitudinal space between the two end vertical support members.

In the event that the length of the cargo being secured against movement is of a relatively long length, it may be desirable to provide an intermediate vertical support member to contact the floor and prevent sagging of the mid-portion of the horizontal member in a manner to maintain the positioning thereof adjacent the interface of two stacked boxes. Thus the filler device of the invention provides a dunnage plug which does not require securement to the railroad car as in the prior art and further, requires a substantially fewer number of elements to achieve its desired result. It should also be apparent that if a stack of more than two boxes is present in the cargo, more than one horizontal member may be incorporated in the filler device if desired.

While the invention has been described with reference to a preferred embodiment, it will be understood by those skilled in the art that various changes may be made and equivalents may be substituted for elements thereof without departing from the true spirit and socpe of the invention. In addition, many modifications may be made to adapt a particular situation and material to the teachings of the invention without departing from its essential teaching.

What is claimed is:

1. A filler device to prevent lateral movement of a load having a plurality of stacked items lying on a horizontal support surface within a transporting vehicle by plugging the space between a lateral side of the load and the sidewall of the transporting vehicle comprising a horizontal disposed U-shaped means having a pair of arms and a base creating a bearing surface substantially contacting at least a pair of items adjacent the interface between two of the stacked items and extending along the longitudinal axis thereof in confrontation to a lateral wall of a load, a plurality of vertical support members respectively having at least one longitudinal edge and a base surface adapted to confront the sidewall of a transporting vehicle carrying the load, said arms of the U-shaped means and the edge of the plurality of support members each including complimentary attachment means adapted to integrally interconnect the U-shaped means and the plurality of support members to plug the space between the load and the transporting vehicle for stabilization of the load therein, said support members having a lower end in bearing contact with the horizontal support surface of the transporting vehicle to provide substantially sole vertical support of the U-shaped means, a plurality of vertical elements having a U-shaped configuration and having a length less than the length of the vertical support member and said vertical elements having a bearing surface to contact the sidewall of the transporting vehicle to provide additional support of the load.

2. The filler device of claim 1 wherein the vertical support members includes a U-shaped cross-section configuration.

3. The filler device of claim 1 wherein the attachment means comprises complimentary elongated slots on the U-shaped means and the plurality of vertical support members.

4. The filler device of claim 1 wherein the horizontally disposed U-shaped means is an elongated U-shaped member adapted to extend along the horizontal dimension of the load.

5. The filler device of claim 4 wherein the plurality of vertical support members includes a pair of members interconnected adjacent a respective end of the elongated U-shaped member.

6. The filler device of claim 1 wherein the horizontally disposed U-shaped means and the plurality of elements include complimentary slot means for integrally interconnecting the U-shaped means and each of the plurality of elements.

7. The filler device of claim 6 wherein said at least one surface of the bearing surface means includes a flat elongated surface oriented in a substantially vertical plane.

8. A filler device to prevent lateral movement of a load lying on a horizontal support surface within a transporting vehicle by plugging the space between a lateral side of the load and the sidewall of the transporting vehicle comprising a horizontally disposed U-shaped means having a pair of arms and a base creating a bearing surface extending along the longitudinal axis thereof in confrontation to a lateral wall of a load, a plurality of vertical support members respectively having at least one longitudinal edge and a base surface adapted to confront the sidewall of a transporting vehicle carrying the load, said arms of the U-shaped means and the edge of the plurality of support members each including complimentary attachment means adapted to integrally interconnect the U-shaped means and the plurality of support members to plug the space between the load and the transporting vehicle for stabilization of the load therein, and said support members having a lower end in bearing contact with the horizontal support surface of the transporting vehicle to provide substantially sole vertical support of the U-shaped means.

* * * * *